US012125262B2

(12) United States Patent
Burkett et al.

(10) Patent No.: US 12,125,262 B2
(45) Date of Patent: Oct. 22, 2024

(54) UNMANNED AERIAL VEHICLE BASED SYSTEM TO TRACK SOLAR PANEL SYSTEM CONSTRUCTION AND COMMISSIONING

(71) Applicant: Inventus Holdings, LLC, Juno Beach, FL (US)

(72) Inventors: Jeffrey R Burkett, Hobe Sound, FL (US); Zachary S Wald, Jupiter, FL (US); Tanvir E. Alam, Palm Beach Gardens, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 486 days.

(21) Appl. No.: 17/689,226

(22) Filed: Mar. 8, 2022

(65) Prior Publication Data

US 2023/0290122 A1 Sep. 14, 2023

(51) Int. Cl.
*G06T 7/00* (2017.01)
*G06Q 10/0637* (2023.01)
(Continued)

(52) U.S. Cl.
CPC .................................. *G06V 10/77* (2022.01)

(58) Field of Classification Search
USPC ....... 382/103, 115–123, 141–159; 706/1–62, 706/900–909, 923
See application file for complete search history.

(56) References Cited

U.S. PATENT DOCUMENTS 9,389,084 B1  7/2016  Chen et al.
10,217,207 B2  2/2019  Marra et al.
(Continued)

FOREIGN PATENT DOCUMENTS

CN  109670515 A  4/2019
CN  110674792 A  1/2020
(Continued)

OTHER PUBLICATIONS

Barajas Hernandez; Generating Georeference Information for Aerial Images; 2017 (Year: 2017).*

(Continued)

*Primary Examiner* — Marcellus J Augustin
(74) *Attorney, Agent, or Firm* — Jose Gutman; Fleit Intellectual Property Law

(57) ABSTRACT

An unmanned aerial vehicle based system, method, and computer program product, for inspection and monitoring construction progress of outdoor power facilities. The method can receive a construction plan and schedule identifying milestones for installation at an outdoor construction site of at least one externally placed piece of equipment specified in the construction plan. A machine learning artificial intelligence processing system identifies, from a set of observed aerial images of the outdoor construction site captured by an unmanned aerial vehicle, at least one externally placed piece of equipment in the outdoor construction site. The identified piece of equipment in the construction site is compared to an expected piece of equipment specified in the construction plan. The difference between identified and expected piece of equipment is reported and the construction schedule can be updated based on the difference. An alert is provided if the difference exceeds a threshold.

20 Claims, 11 Drawing Sheets

(51) Int. Cl.
  *G06Q 10/0639* (2023.01)
  *G06Q 50/08* (2012.01)
  *G06T 7/70* (2017.01)
  *G06V 10/77* (2022.01)

(56) References Cited

U.S. PATENT DOCUMENTS

| | | | |
|---|---|---|---|
| 10,235,566 | B2 | 3/2019 | Alvarez Gonzalez et al. |
| 10,354,439 | B2 | 7/2019 | Carrington |
| 10,460,173 | B2 | 10/2019 | Sasson et al. |
| 10,467,758 | B1 | 11/2019 | Lorenzo |
| 10,592,765 | B2 | 3/2020 | Fathi et al. |
| 10,719,641 | B2 | 7/2020 | Morczinek et al. |
| 10,944,959 | B2 | 3/2021 | Fleischman et al. |
| 11,381,726 | B2 * | 7/2022 | Zass ............... G06T 7/001 |
| 11,710,085 | B2 * | 7/2023 | Alsahlawi ........ G06N 20/00 706/12 |
| 2018/0012125 | A1 | 1/2018 | Ladha et al. |
| 2019/0285412 | A1 | 9/2019 | Jarroush |
| 2019/0286985 | A1 | 9/2019 | Hirvijarvi et al. |
| 2020/0410424 | A1 | 12/2020 | Bellaish et al. |
| 2020/0413011 | A1 | 12/2020 | Zass et al. |
| 2021/0073928 | A1 * | 3/2021 | Sasson ............. G06V 10/10 |
| 2021/0125406 | A1 | 4/2021 | Henry et al. |
| 2021/0158207 | A1 | 5/2021 | Alsahlawi et al. |
| 2021/0167726 | A1 | 6/2021 | Guelbenzu Michelena et al. |
| 2021/0173414 | A1 | 6/2021 | Starr et al. |
| 2021/0192225 | A1 * | 6/2021 | Kim ............... G06N 3/088 |
| 2022/0077820 | A1 * | 3/2022 | Jeong ............ G06T 5/80 |
| 2023/0166299 | A1 * | 6/2023 | Kim ............... B24B 53/017 451/6 |
| 2023/0237795 | A1 * | 7/2023 | Van Niekerk ........ G06V 20/176 382/103 |
| 2024/0281773 | A1 * | 8/2024 | Toribio ............. G06N 3/08 |

FOREIGN PATENT DOCUMENTS

| | | |
|---|---|---|
| CN | 112036336 A | 12/2020 |
| CN | 112150031 B | 6/2021 |
| WO | 2019041191 | 3/2019 |
| WO | 2020050461 | 3/2020 |
| WO | 2020136918 | 7/2020 |

OTHER PUBLICATIONS

Doxel, "https://www.doxel.ai/doxel-schedule" Aug. 2021.
DroneNerds, "The Rise of Drones in Construction", Jan. 25, 2020.
Equinox's Drones, "Construction Site Monitoring using Unmanned Aerial Vehicle" 2020.
The Sitemark Fuse Platform, https://www.sitemark.com/platform/overview/ 2020.
Skycatch, "Aerial Drone Photogrammetry for Construction", https://skycatch.com/drone-photogrammetry 2020.

* cited by examiner

| 716 ↱ 802 C-E ID | 804 Start Date | 806 End Date | 810 C-E CAD Count | 812 C-E CAD Loc. | 814 Make/ Model/ Specification | 816 CAD to Recog. Count Diff | 818 CAD to Recog. Loc. Diff | 820 Compliance Req. | 822 Compliance Status | 824 Project Design Tracking Data |
|---|---|---|---|---|---|---|---|---|---|---|
| | | | | | | | | | | |
| | | | | | | | | | | |
| | | | | | | | | | | |
| | | | | | | | | | | |

FIG. 8

| 718 ↱ 902 ID | 904 Construct Plan ID | 906 Time Point | 908 End Date | 910 C-E1 CAD Count | 912 C-E1 CAD Loc. | 914 C-E1 Recog. Count | 916 C-E1 Recog. Loc. | 920 C-E2 CAD Count | 922 C-E2 CAD Loc. | 924 C-E2 Recog. Count | 926 C-E2 Recog. Loc. | 928 Previous Sched. ID |
|---|---|---|---|---|---|---|---|---|---|---|---|---|
| | | | | | | | | ⋮ | ⋮ | ⋮ | ⋮ | |
| | | | | | | | | | | | | |
| | | | | | | | | | | | | |
| | | | | | | | | | | | | |

FIG. 9

UNMANNED AERIAL VEHICLE BASED SYSTEM TO TRACK SOLAR PANEL SYSTEM CONSTRUCTION AND COMMISSIONING

FIELD OF THE DISCLOSURE

The present invention generally relates to construction project tracking systems, particularly to aerial monitoring and inspecting of construction components and elements of a construction project at a construction site to track the construction project's progress.

BACKGROUND

The Smithsonian Institution has characterized the North American power grid as the largest machine ever built by humanity. The size, geographic diversity, environmental diversity, and the multitude of components that comprise the power grid presents unique challenges in the rapid and efficient upgrading of the system with diverse new technologies that realize America's objective of improved power grid reliability and hardening.

The construction of new power facilities, such as solar-driven or wind-driven, is becoming essential to affect the successful deployment of such new types of facilities. Unfortunately, the daily manual tracking of construction project progress can be inefficient and costly, particularly in constructing such new types of power facilities. This inadequate tracking of construction project progress can typically result in significant construction delays, unpredictable construction schedules, and significant cost overruns, often because of late detection of construction defects and subsequent attempts to remediate such construction defects.

BRIEF DESCRIPTION OF THE SEVERAL VIEWS OF THE DRAWINGS

The accompanying figures can include the same reference numerals that refer to identical or functionally similar elements throughout the separate views. These figures, together with the specification, which contains the detailed description below, serve to illustrate various embodiments and to explain different principles and advantages and are all incorporated into the present disclosure, in which:

FIG. 8 is a tabular diagram illustrating an example of a construction plan database that stores a machine-readable construction plan in the information processing system shown in FIG. 7, per various embodiments of the invention;

FIG. 9 is a tabular diagram illustrating an example of a construction schedule database that stores a machine-readable construction schedule in the information processing system shown in FIG. 7, according to various embodiments of the invention;

DETAILED DESCRIPTION

As required, this section discloses detailed embodiments; however, the disclosed embodiments are merely examples that illustrate systems and methods described below in various forms. Therefore, specific structural and functional details disclosed herein are only non-limiting examples provided as a basis for the claims and teaching one skilled in the art to variously employ the disclosed subject matter in virtually any appropriately detailed structure and function. Further, the terms and phrases used herein are not limiting but rather provide an understandable description.

The below-described examples of systems and methods provide various technical solutions for inspecting and monitoring construction progress by streamlining, increasing efficiency, and enhancing the performance of monitoring at least one externally placed piece of equipment in an outdoor construction site. An inspection and monitoring system and method, according to various embodiments, can autonomously track the progress of the construction project and can detect and respond to detected construction defects in near real-time during a construction project.

Various embodiments of the invention further facilitate the generation and display of reports and alerts for operation personnel and project management. Such an alert message can include displaying a warning of detected construction defects to a system operator/user. An alert message can be provided, for example, if a difference between an expected and an actually identified individual piece of equipment exceeds a predefined threshold. In response to such a warning, project management and repair crews can be rapidly deployed to the outdoor construction site soon after the construction defects are detected. Furthermore, the detection of construction defects at an outdoor construction site can be performed in near real-time during construction at the outdoor construction site, even before the construction defects are realized by construction crews and project site management, as discussed in more detail below. Various embodiments of the invention are not limited to inspecting/monitoring the construction of power utility facilities. Construction of other types of buildings, outdoor structures, and outdoor facilities, can also be aerially reviewed (monitored) by an information processing system according to various embodiments of the invention.

Figure 1:
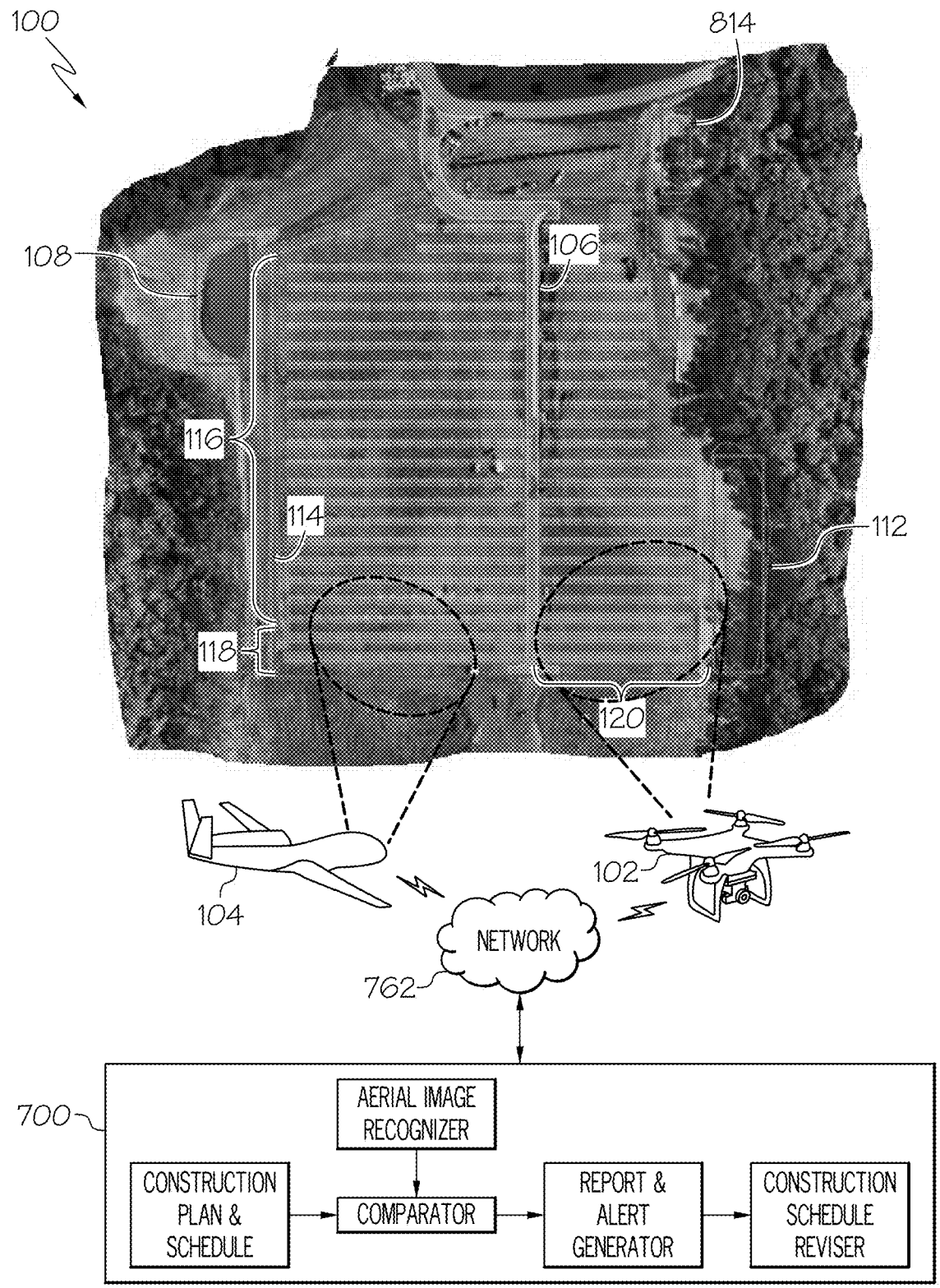
FIG. 1 is an illustrative example of a system for unmanned aerial vehicle (UAV) based aerial inspection of at least one externally placed piece of equipment within an outdoor construction site for a solar panel system under construction, according to various embodiments of the invention.

Referring to FIG. 1, an example of a construction project at an outdoor construction site 100 is shown.

The outdoor construction site 100 can be inspected and monitored by an inspection and monitoring system, as will be discussed below. According to various embodiments, at least one unmanned aerial vehicle (UAV) 102, 104 can fly over the outdoor construction site 100 during the operation of a construction project. In certain embodiments, the UAV 102 can be an autonomous UAV that performs inspections of an outdoor construction site 100 under control of a processor executing computer program instructions without requiring continuous human intervention.

In the example shown in FIG. 1, two unmanned aerial vehicles 102, 104 can contemporaneously perform aerial inspections of one outdoor construction site 100. Such unmanned aerial vehicles 102, 104 can also be referred to as UAVs, uncrewed aerial vehicles, aerial drones, or simply drones, or the like. Such a drone, in certain embodiments, can be autonomous. It can fly autonomously using a processor operating in response to machine-readable software-controlled flight plans embedded in storage memory onboard the unmanned aerial vehicle. Alternatively, a remote controller can remotely control such a drone 102 by a remote controller, such as any one or more of 1) a remotely located human operator manually controlling the unmanned aerial vehicle, or 2) a remote information processing system controlling the unmanned aerial vehicle, or 3) a combination of both types of remote controller. According to various embodiments, the remote controller can wirelessly transmit data and commands to the unmanned aerial vehicle that is inspecting (monitoring) the outdoor construction site 100 and can wirelessly receive collected data transmitted from the unmanned aerial vehicle 102 to the remote controller.

According to an example in FIG. 1, for simplicity of the present disclosure will be discussed that a UAV 102 inspects (monitors) a construction project performed at an outdoor construction site 100. However, multiple UAVs 102, 104 can contemporaneously inspect (monitor) an outdoor construction site 100 according to various embodiments.

The construction project in this example represents the construction of a solar-driven power facility. Such a construction project may also be referred to as solar panel system under construction.

The solar power facility can be a solar farm, a solar-based electrical power plant, or the like. In addition, according to various embodiments, a construction project can include construction of another type of power facility or construction of multiple power facilities on one or more associated constructions sites considered individually or collectively as a construction site.

Under construction in construction site 100, the power facility can comprise a wind-based electrical power plant. Such a wind-based electrical power plant can be a wind turbine farm. A construction project can include a solar-based electrical power plant, a wind-based electrical power plant, another type of power facility, or any combination thereof.

The captured aerial image of the outdoor construction site 100, as shown in the example of FIG. 1, is displayed with an overlay of images of expected externally placed one or more pieces of equipment to place in a solar power facility. The overlay of images represents one or more pieces of equipment placed, or planned (expected) to be placed, in the outdoor construction site 100 of a solar power facility.

The collection of representations in the overlay on the captured aerial image shown in FIG. 1 is part of a computer-aided design (CAD) plan defined by technical personnel (e.g., power plant design engineers) associated with a construction project for constructing the solar power facility in the outdoor construction site 100.

The CAD construction plan (also referred to as a construction plan) comprises a database that includes information about the construction project. The construction plan database includes machine-readable information about the construction plan. For example, the machine-readable information can include:

One or more reference aerial images of individual pieces of equipment planned (expected) to be placed in the outdoor construction site 100 of the solar power facility.

Manufacturer-provided information about each piece of equipment (e.g., its model number, serial number, product description, and product specifications).

Construction information associated with the individual piece of equipment.

Such specific construction information can include, for example, the piece of equipment or components thereof; the precise location of installation in the outdoor construction site; its particular installation requirements; or specific time point(s) when to expect delivery of the individual piece of equipment, or components thereof; or any combination. Such detailed construction information is provided into the construction plan database, according to various embodiments, by the technical personnel (e.g., the power plant design engineers).

The construction plan database also includes a machine-readable construction schedule that describes time-based activities (identifies milestones) associated with the construction project in the constructions site 100. These time-based activities can include, for example, what specific construction activity is expected (planned) at certain time points within specified time spans during the construction project; or what specific individual pieces of equipment, or components thereof, are expected (planned) to be placed, e.g., delivered, installed, or constructed, in certain locations in the outdoor construction site 100 at certain time points within specified time spans during the construction project; or a combination thereof.

Such construction plan and schedule can be communicatively coupled with an information processing system 700. This is generally shown by an example in FIG. 1. See also FIG. 7 for a more detailed example.

The UAV 102 flying over the construction site 100 can aerially monitor actual individual pieces of equipment, or components thereof, externally placed in the outdoor construction site 100. The construction activities associated with externally placing actual individual pieces of equipment, or components thereof, in the outdoor construction site 100 can include being delivered, installed, constructed, or a combination of the three. An examples of captured aerial images of actual individual pieces of equipment externally placed in the outdoor construction site 100 is shown in FIG. 1. The actual aerial images of the pieces of equipment captured by the UAV 102 can be wirelessly transmitted via a network 762 to an information processing system 700. The actual aerial images can be analyzed and recognized (identified) by an aerial image recognizer and compared by a comparator (in the inspection/monitoring system) with the overlay of expected (planned) visual images of the same pieces of equipment as part of an inspection/monitoring process, as discussed more fully below.

Various embodiments of the invention further facilitate the generation and display of reports and alerts for operation personnel and project management. Such an alert message can include displaying a warning of detected construction defects to a system operator/user. An alert message can be provided, for example, if a difference between an expected and an actually identified individual piece of equipment exceeds a predefined threshold. In response to such a warning, project management and repair crews can be rapidly deployed to the outdoor construction site soon after the construction defects are detected. Furthermore, the detection of construction defects at an outdoor construction site can be performed in near real-time during construction at the outdoor construction site, even before the construction defects are realized by construction crews and project site management, as discussed in more detail below. According to certain embodiments, a construction schedule reviser in the inspection and monitoring information processing system 700 can create a revised machine-readable construction schedule by updating the current machine-readable construction schedule. The construction schedule reviser can update the schedule based on a determined difference between the identified and the expected at least one externally placed piece of equipment in the outdoor construction site 100 at one or more time points within respective time spans during a construction project, as will be further discussed below.

According to various embodiments, the term "externally placed piece of equipment" can mean, but is not limited to, any one or more of a solar power module (a module), a solar panel, a post and screw base, a racking component, an inverter (string or central inverter), a riser pole, an outside transformer and switchgear and an integrated skid, a site fence, a silt fence, an outdoor power facility structure, an outdoor land grading feature, a road in the construction site, a site trench, a site water management structure, a site water retention pond, or other outdoor construction elements, or a combination thereof, being constructed in the outdoor construction site 100 according to a construction plan and a construction schedule.

For example, as shown in FIG. 1, there are three water management structures that are referred to as water retention ponds 108, 110, 112. Also shown is an unfinished gravel road 106 extending from a top portion to a bottom part of the outdoor construction site 100. A silt fence 114 follows a perimeter of a lower-left corner of the outdoor construction site 100. These are only examples of construction elements, pieces of equipment, or both, externally placed in the outdoor construction site 100.

In the example shown in FIG. 1, the overlay visual images represent a collection of planned (expected) pieces of equipment 116 to be delivered, installed, or constructed, or a combination thereof, in planned locations in the outdoor construction site 100.

Also illustrated in FIG. 1 are collections of actual delivered, installed, or constructed, or a combination thereof, externally placed pieces of equipment 118, 120. In this example, the collections of externally placed individual pieces of equipment 118, 120 include a collection of modules.

The first set of observed aerial images of the construction site 100, such as the one shown in FIG. 1, are aerially captured by at least one UAV 102, 104, following a flight path over the construction site 100. The first set of observed aerial images of the construction site 100, in this example, can be captured by the UAV 102 at one or more time points within one or more time spans. These time spans are specified in a machine-readable construction schedule associated with a machine-readable construction plan. Both plans correspond to a construction project performed in the outdoor construction site 100. The machine-readable construction schedule can identify milestones for installation in the outdoor construction site 100 of at least one externally placed piece of equipment specified in the machine-readable construction plan.

As the UAV 102 follows a flight path over the outdoor construction site 100, the UAV 102 aerially captures, for example, the first set of observed aerial images comprising a particular portion of the outdoor construction site 100. The specific portion includes a collection 120 of actual externally placed individual pieces of equipment, which in this example are modules. The first set of observed aerial images of the outdoor construction site 100, comprising this particular portion, can be observed and aerially captured by the UAV 102 using an onboard camera system optically coupled to a receiving optical train that coupled optical data information to the camera device, as more fully discussed below. According to various embodiments, the first set of observed aerial images can be aerially captured by the UAV 102 operating according to the first set of observation parameters.

Figure 10:
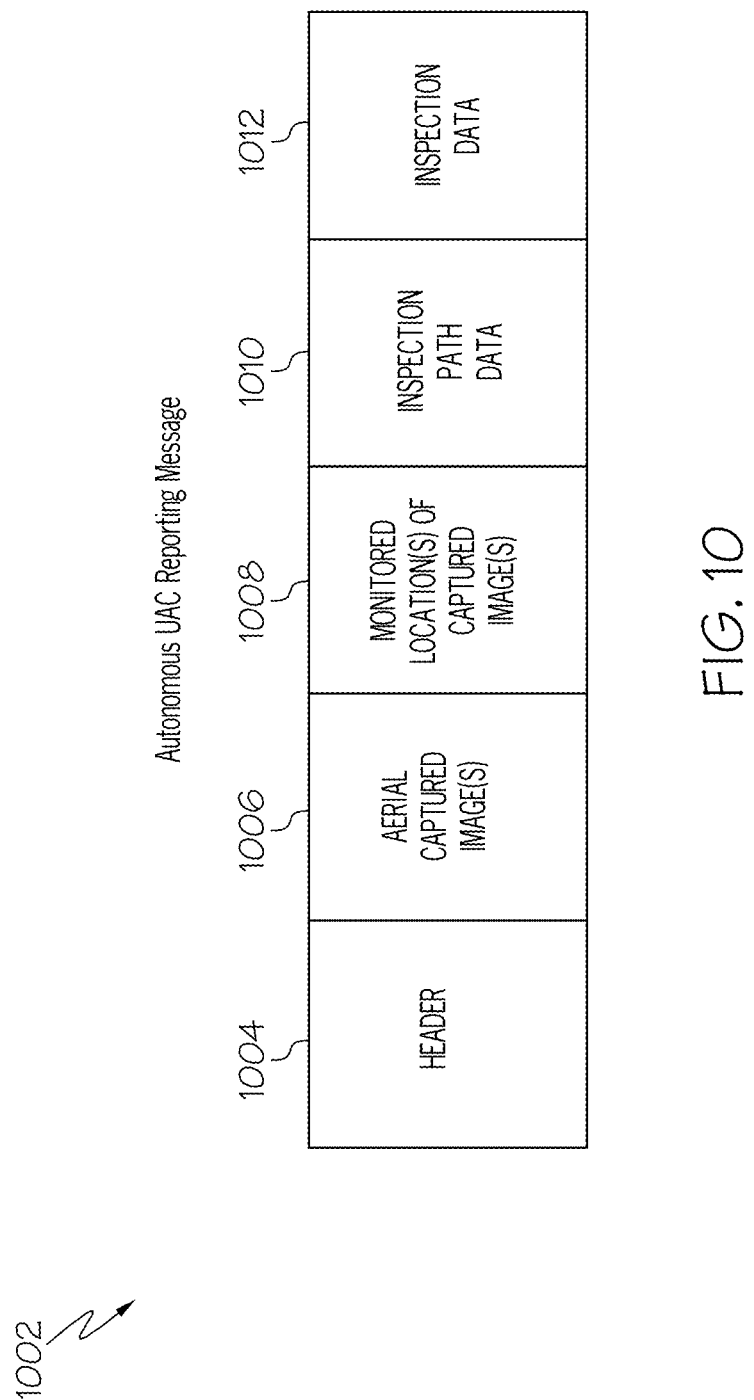
FIG. 10 is a diagram illustrating an example of a reporting message packet that can be wirelessly transmitted from the unmanned aerial vehicle of FIG. 6 to the information processing system of FIG. 7, according to various embodiments of the invention.

This particular portion of the outdoor construction site 100 includes a collection 120 of actual externally placed pieces of equipment that were at least one of delivered, installed, or constructed, in the construction site 100. This first set of observed aerial images, in the example, can be aerially captured and then analyzed by a monitoring unit 620 and monitoring system 628 interoperating with a processor 602 executing computer instructions 612 onboard an autonomous UAV 102 (see FIG. 6). According to various embodiments, the monitoring system 628 in the UAV 102 interoperates (via wireless communication such as illustrated in FIG. 10) with a construction site analyzer 742. The construction site analyzer 742, in the example, is embedded in an autonomous remote controller, e.g., a remotely located information processing system 700 (see FIG. 7).

The construction site analyzer 742 can compare one or more images of a collection 120 of identified actual externally placed individual pieces of equipment to one or more images of an expected (planned) corresponding collection 120 of externally placed individual pieces of equipment as specified in a machine-readable construction plan, which such individual pieces of equipment are expected to be externally placed (located) in the portion of the outdoor construction site 100 at one or more time points within respective time spans during the construction project as specified in a machine-readable construction schedule associated with the machine-readable construction plan. These time points within respective time spans can represent project milestones for installation in the outdoor construction site 100 of at least one externally placed piece of equipment specified in the machine-readable construction plan.

The construction site analyzer 742, based on the comparison, can determine an observed difference between an identified actual externally placed piece of equipment and a corresponding expected (planned) externally placed piece of equipment, as more fully discussed below. One or more images of an expected externally placed piece of equipment 120 are accessed from, for example, a database system 716 associated with a machine-readable construction plan and a database system 718 associated with a machine-readable construction schedule, as more fully discussed below.

While the construction plan database system 716 is illustrated separate from the construction schedule database system 718, according to various embodiments, both machine-readable plans can be in a collective database system 716, 718.

In response to the construction site analyzer 742 determining an observed difference between an identified actual and an expected (planned) externally placed piece of equipment, different courses of action can then be taken by a system 700, as discussed below. The construction site analyzer 742 in this case determines the difference by analyzing the first set of observed aerial images with the UAV 102 operating according to the first set of observation parameters. Some example courses of action are discussed in detail in the following section entitled "Example Courses of Action to Take Based on an Observed Difference."

One Example Course of Action to Take by the Inspection and Monitoring System and Method.

In response to the construction site analyzer 742 determining an observed difference between an identified actual and an expected planned externally placed piece of equipment from analyzing the first set of observed aerial images with the UAV 102 operating according to the first set of observation parameters, the system 700 can change the first set of observation parameters to the second set of observation parameters in the UAV 102. In response to the construction site analyzer 742 determining a difference, according to various embodiments, the construction site analyzer 742 wirelessly communicates with the onboard monitoring system 628 in the UAV 102 to control and adjust (change) the first set of observation parameters to the second set of observation parameters in the UAV 102. The second set is different from the first set. The UAV 102 then observes and captures a second set of aerial images of the construction site 100 using the second set of observation parameters.

For example, and not for limitation, the second set of observation parameters in the UAV 102 can cause the UAV 102 to capture enhanced aerial images of the outdoor construction site 100 by a change of focus of a telescopic optical lens in a receiving optical train coupled to a camera device onboard the UAV 102. This change can increase the image magnification of aerially captured observed images. The camera device is operationally coupled to the processor 602 in the UAV 102. The processor 602 can change the operational parameters of the camera device. As another example, the second set of observation parameters in the UAV 102 can cause the UAV 102 to change its inspection flight path, for example, to fly at a lower altitude (closer to the ground in the construction site 100), thereby capturing enhanced aerial images of the construction site 100. As a third example, which may be combined with one or more of examples 1 or 2, the second set of observation parameters in the UAV 102 can cause the UAV 102 to change a first digital processing algorithm to an alternative second digital processing algorithm in its image processing of the captured aerial images. The UAV 102 thereby captures enhanced aerial images of the construction site 100 at a higher image resolution, with more detailed content in captured image information or a combination of both. According to various embodiments, the enhanced aerial images are captured, for example, by using color; or low-light or night-vision; or ultra-violet (UV) light-vision that can enhance image content under certain weather conditions; or a combination thereof). The processor 602 can change operational parameters of the camera device and the receiving optical train. This change can include, for example, a change in the optical lens, a change in one or more filters, a change in a digital processing algorithm used by the camera device electronics and the processor 602, or any combination thereof.

In certain embodiments, multiple cameras can be used, either individually or collectively in any combination, in the UAV 102 to observe and aerially capture images of the construction site 100.

The second digital processing algorithm, for example, might consume more resources or take longer to complete processing while onboard the UAV 102. Under certain embodiments, the enhanced aerial image capture may be made by the UAV 102 after the inspection/monitoring system determines that: 1) the construction site analyzer 742 has determined an observed difference, as discussed above; 2) the UAV 102 has sufficient resources to perform the alternative second digital processing algorithm; or 3) any combination thereof. According to various embodiments, a second set of observed aerial images can then be aerially captured by the UAV 102 operating according to the second set of observation parameters, as more fully discussed below. One example of an observed captured aerial image in the second set of observed captured aerial images, captured by the UAV 102 using a second set of observation parameters, is illustrated in FIG. 2.

Figure 2:
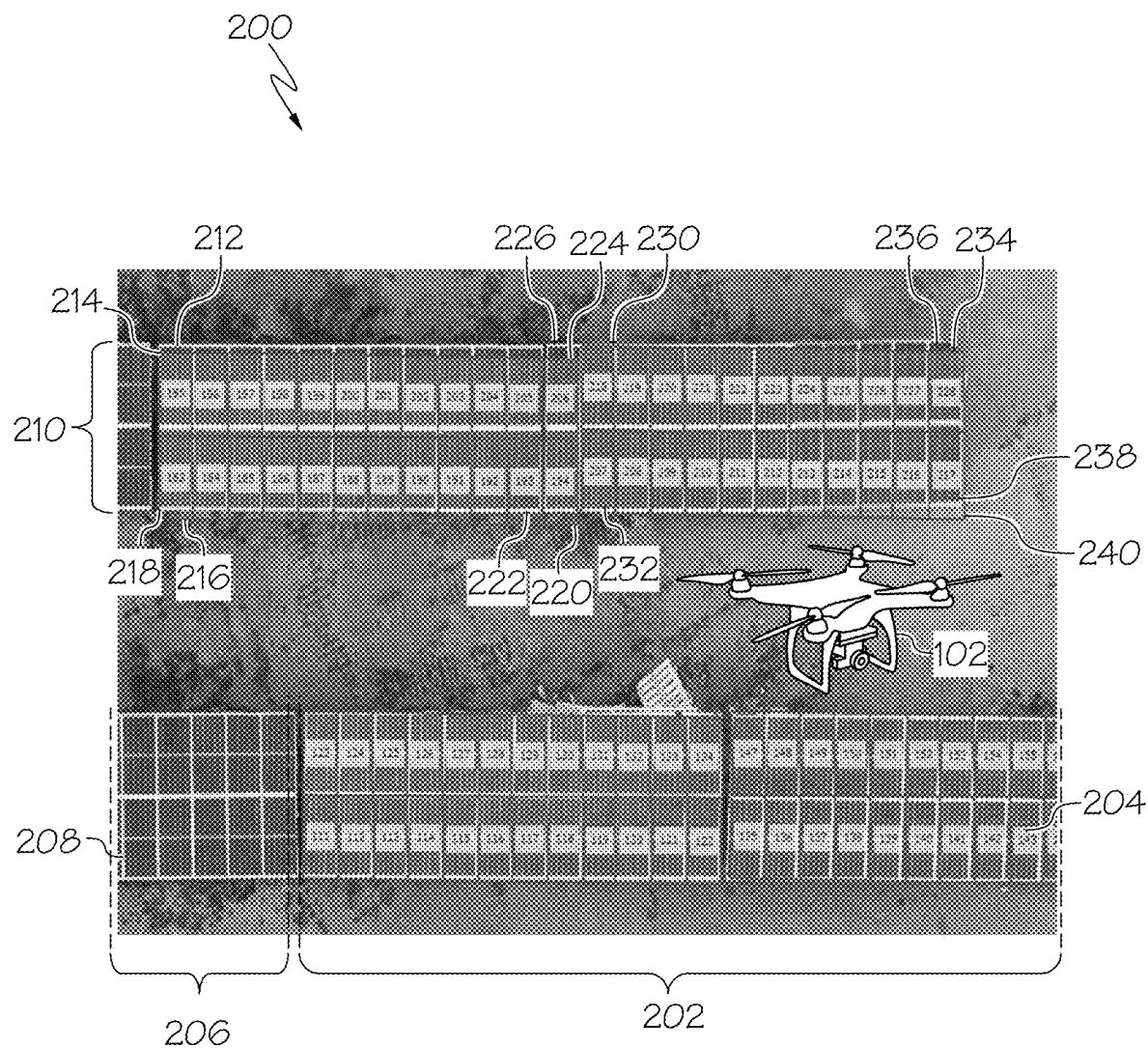
FIG. 2 is a more detailed illustrative example of the system of FIG. 1 performing a UAV-based aerial inspection of at least one externally placed piece of equipment, the UAV performing enhanced aerial image capture of a particular portion of the outdoor construction site, according to various embodiments of the invention.

Continuing with the example above, referring to both FIGS. 1 and 2, the UAV 102 operates according to the second set of observation parameters while following a flight path over the outdoor construction site 100. The UAV 102 aerially captures the second set of observed aerial images of the particular portion of the outdoor construction site 100 while operating according to the second set of observation parameters. FIG. 2 shows an example of an enhanced aerial image captured by the UAV 102 while operating according to the second set of observation parameters. The UAV 102, therefore, according to the example, performs aerial image capture of the construction site 100 thereby capturing a first set of aerial images while operating according to the first set of observation parameters and also performs further aerial image capture of the construction site 100 thereby capturing a second set of aerial images while operating according to the second set of observation parameters.

The first set of observation parameters are used by the UAV 102 while flying over the outdoor construction site 100, for example, to observe by coarse observation a large portion of the outdoor construction site 100. According to various embodiments, the term coarse observation broadly means aerial observation by the UAV 102 that can capture aerial images of a larger portion of the outdoor construction site 100, up to 100% of the site 100. Such coarse observation uses one or more of: the UAV 102 flying at a higher altitude; or the UAV 102 using a lower telescopic focus (reduced magnification of images) or alternative filtering or both, in the UAV 102; or the UAV 102 using a digital processing algorithm that consumes fewer resources and operates faster in the UAV 102 while possibly capturing aerial images of a lower resolution; or a combination thereof.

In response to the construction site analyzer 742 determining an observed difference between the identified and the expected externally placed piece(s) of equipment, the UAV 102 can change (adjust) the first set of observation parameters to the second set of observation parameters. This change can result in the UAV 102 performing enhanced aerial image capture of the particular portion of the outdoor construction site 100 while operating according to the second set of observation parameters. The ML/AI system uses trained classifiers 720 that have been trained with a training data set that includes enhanced aerial images of individual pieces of equipment. The UAV 102 can observe and capture enhanced images of the outdoor construction site 100 while operating according to the second set of observation parameters. The construction site analyzer 742 can determine an observed difference between identified and the expected externally placed piece(s) of equipment, using the ML/AI system's trained classifiers 720, the decision rules 724, and the decision rules processor 750, to identify individual pieces of equipment in the aerially captured enhanced images. The ML/AI system uses machine learning based artificial intelligence image recognition to analyze captured enhanced aerial images of the outdoor construction site 100, and to identify at least one externally placed piece of equipment in the outdoor construction site 100.

The UAV 102, following a flight path, flies over the particular portion of the construction site 100 and observes and aerially captures the second set of images (enhanced images) while operating according to the second set of observation parameters.

The aerially captured image 200 is in the second set of aerially captured images. The second set of observation parameters are used by the UAV 102 while flying over the outdoor construction site 100, for example, to observe by fine (enhanced) observation the particular portion of the outdoor construction site 100. For example, the second set of aerially captured images can increase image magnification of aerially captured observed images in the second set of observed aerial images.

FIG. 2 shows multiple collections of actually located modules in the particular portion of the outdoor construction site 100, such as the collection 202 of actually located modules 204. Each module 204 is identified by a filled-in rectangle as shown.

Additionally, the aerially captured image 200 shows two collections 206, 210, of racks 208 without installed modules. A rack 208, in the example, is a piece of equipment that after being installed in the construction site 100 can receive installation of a module 204 on the rack 208.

With reference to FIG. 2, the flying UAV 102 observes a particular collection of actually delivered and installed individual modules 218. The empty rectangles 214, 218, 222, 226, 230, 232, 236, 238 represent overlay images displayed on the aerially captured image 200. The empty rectangles 214, 218, 222, 226, 230, 232, 236, 238 are individual modules that are delivered and installed, or that are expected (planned) to be delivered and installed, in the particular portion of the construction site 100, per a construction plan and construction schedule associated with the construction project in the outdoor construction site 100. The filled-in rectangles 212, 216, 224, 220, 234, 240, represent observed modules delivered and installed in the particular portion in the construction site 100.

As seen in FIG. 2, the several actual installed modules, viewed from left to right, were installed at locations progressively further away from the expected (planned) installation locations of these same modules (represented by the overlay of empty rectangles in FIG. 2). The construction site analyzer 742 can analyze one or more aerially captured images 200 and identify construction errors (defects) to report to a construction project manager.

In this example, the actual installed identified modules (shown by the filled-in rectangles of modules, for example, 212, 216, 220, 224, 230, 232, 234, 240) located in the particular portion of the outdoor construction site 100 can be compared to the expected (planned) modules to be located (delivered and installed) in the particular portion of the outdoor construction site 100. The expected (planned) individual modules are represented by overlay images of empty rectangles of modules, for example, 214, 218, 222, 226, 230, 236, 238), at locations where these individual modules are expected (planned) to be installed at a particular time point within a time span during the construction project as specified in a machine-readable construction schedule.

The construction site analyzer 742, based on the comparison of the enhanced set of images 200, can determine an observed difference between the identified and the expected at least one externally placed piece of equipment in the outdoor construction site, as discussed in more detail below.

The determined difference between the identified and the expected at least one externally placed piece of equipment in the outdoor construction site, according to various embodiments, comprises at least one of: 1) a difference in visual appearance of the identified and the expected at least one externally placed piece of equipment; 2) a difference in orientation in the construction site of the identified and the expected at least one externally placed piece of equipment; 3) a difference in location in the construction site of the identified and the expected at least one externally placed piece of equipment; or 4) a difference of the identified and the expected at least one externally placed piece of equipment in the construction site based on any one or more of the following: a) a difference in manufacturer part number of the at least one piece of equipment, b) a difference in manufacturer serial number of the at least one piece of equipment, or c) a difference in construction site identification code of the at least one piece of equipment.

As discussed below, different courses of action can then be taken by an inspection and monitoring information processing system.

Example Courses of Action to Take Based on an Observed Difference.

For example, the inspection and monitoring system 700 can generate and display reports for review by construction project management. Construction defects can be identified in these reports even before the actual construction crews in the construction site 100 realize the defects have occurred in the construction site 100. The displaying reports can include, according to certain embodiments, displaying the determined observed difference via a display device of an information processing system. The displaying the determined observed difference, according to certain embodiments, comprises displaying one of a plurality of different colors based on whether the determined observed difference exceeds at least a first threshold.

As a second example, if system 700 detects certain important defect conditions in the construction site 100, such as the defective location of several modules discussed above, the system generates alerts (alert signals) to construction project management and to repair crews. Information about an alert condition, for example, is displayed via a computer terminal or console to an operator/user of the system. Information about an alert condition can be displayed in a mobile wireless device or mobile phone for rapid deployment of project management and repair crews to the outdoor construction site 100 as soon as construction defects are detected by the system 700. Alerts can then be generated by the system 700 in near real-time after the defects are detected. The term "near real-time" generation of alerts means that the system, based on detecting construction defects, can quickly alert construction management and repair crews even before construction personnel at the construction site realize the particular defects have occurred. An alert message can be generated, for example, if a difference between an expected individual piece of equipment and an identified individual piece of equipment exceeds a predefined threshold.

As a third example, the inspection and monitoring information processing system 700 can create a revised machine-readable construction schedule by updating the machine-readable construction schedule based on the determined difference between the identified and the expected at least one externally placed piece of equipment in the outdoor construction site 100 at one or more time points within respective time spans during the construction. Certain project milestones (e.g., time point within respective time spans) can be revised in the construction schedule for installation in the outdoor construction site 100 at least one externally placed piece of equipment specified in the machine-readable construction plan. By creating a revised machine-readable construction schedule it can update the machine-readable construction schedule by changing a projected end time of a construction activity specified in the machine-readable construction plan, the machine-readable construction schedule, or both.

Figure 3:
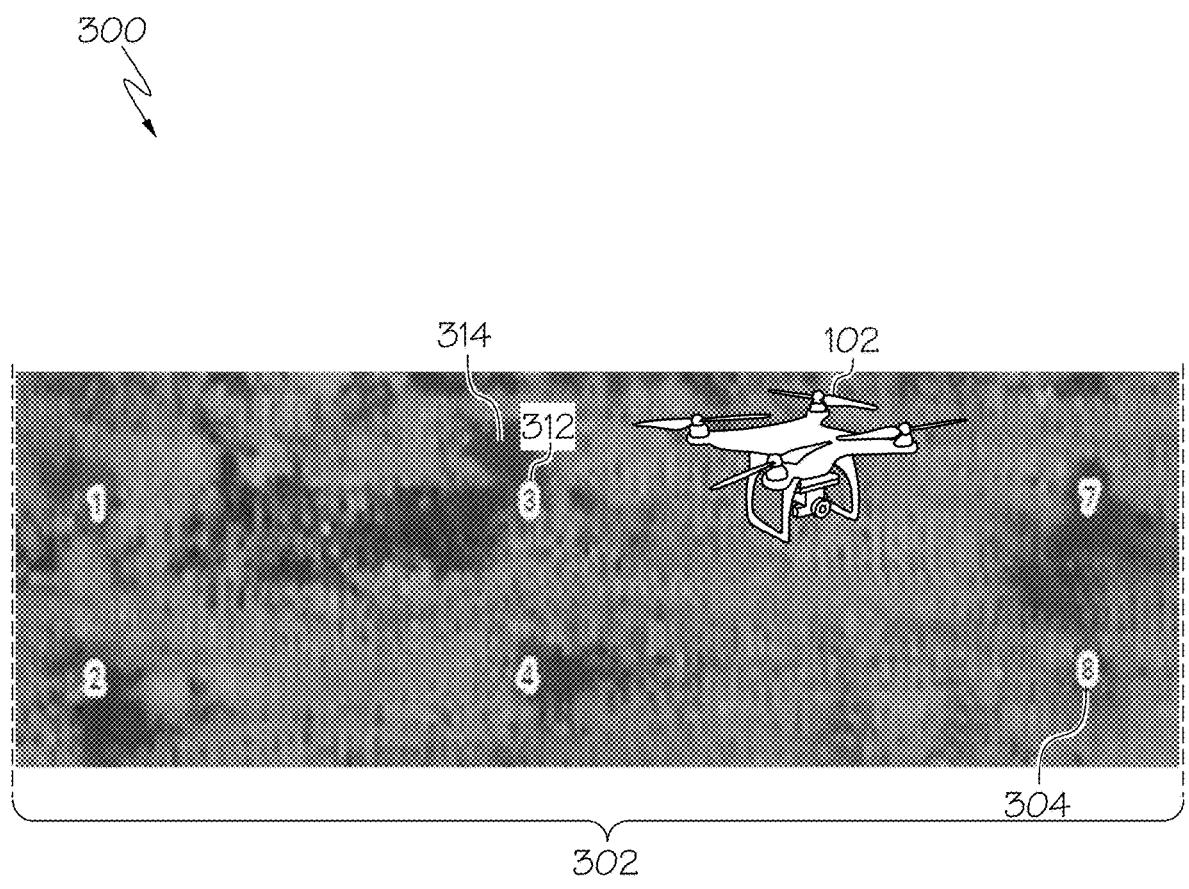
FIG. 3 is a more detailed illustrative example of the system of FIG. 1 performing a UAV-based aerial inspection of at least one externally placed piece of equipment within the outdoor construction site. The UAV, according to the example, captures enhanced aerial images of a particular portion of the outdoor construction site, according to various embodiments of the invention.

Additional Examples of Enhanced Aerial Image Capture of an Outdoor Construction Site FIG. 3 illustrates one captured aerial image 300 in a set of observed captured aerial images showing a portion 302 of a construction site 100 wherein a UAV 102 can fly overhead and capture such aerial images 300. In this case, a portion of the construction site 100 is expected to have installed eight poles with screw bases (also called poles and screws) as indicated by numerical overlays such as the numerical overlays 304, 312, shown in the captured aerial image 300. The expected poles and screws 304, 312 were not installed at their expected locations on the land 314 in the construction site 100 at the particular time when the aerial images 300 were captured.

Figure 5:
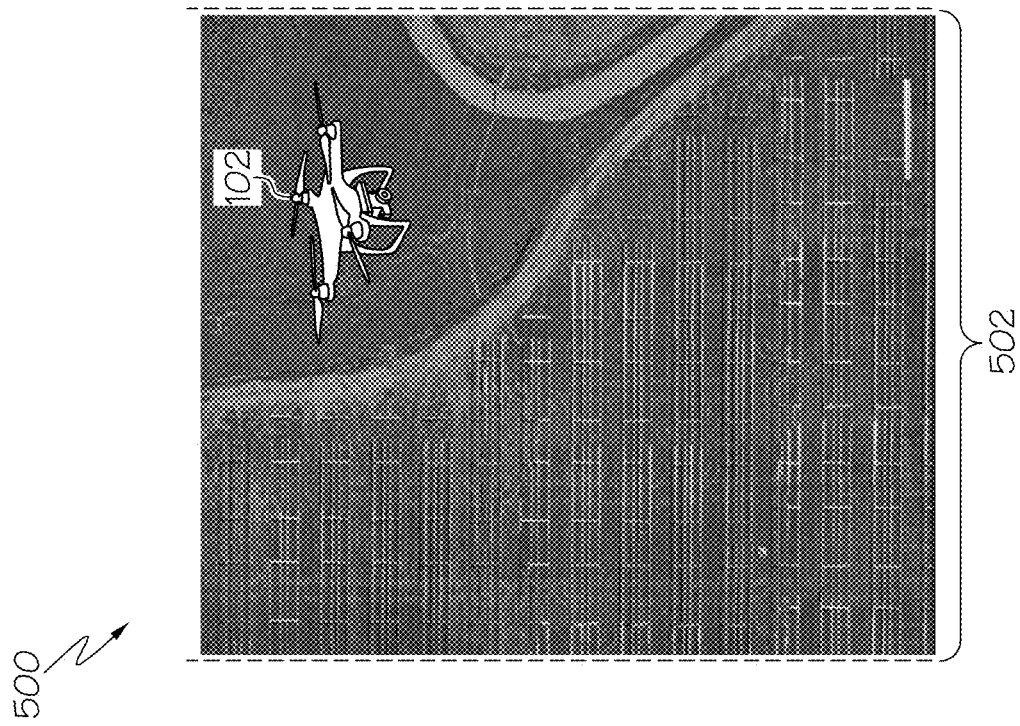
FIGS. 4 and 5 collectively comprise a more detailed illustrative example of the system of FIG. 1 performing a UAV-based aerial inspection of at least one externally placed piece of equipment within the outdoor construction site at two separate time points, the UAV performing enhanced aerial image capture of a particular portion of the outdoor construction site, according to various embodiments of the invention.
Figure 4:

FIGS. 4 and 5 illustrate examples of captured aerial images of the same portion of the construction site 100 captured at two separate times. A UAV 102 flying over the construction site 100 following its flight plan can capture enhanced images of at least one externally placed piece of equipment at two different times.

A first time is shown in the captured image 400 of FIG. 4, and a second later time is shown in the captured image 500 of FIG. 5.

Referring to FIG. 4, a collection 402 of installed poles and screws 404 is shown, installed before installing racks 408. FIG. 4 also shows a collection 406 of racks 408. This captured aerial image 400 shows, from left to right, a progression of construction activity. The captured image 400 of FIG. 4 shows two collections 402, 406 of individual pieces of equipment identified as having been installed at the first point in time in a construction schedule.

The captured image 500 of FIG. 5 shows one collection 502 of installed racks 408 captured at the second point in time in the construction schedule. At each of the first and second points in time, captured aerial images of installed individual pieces of equipment 404, 408, can be compared by an inspection and monitoring system 700 to expected (planned) individual pieces of equipment shown as overlay images on the captured images 400, 500. The inspection and monitoring system, based on the comparison, can report the progress of a construction project to project management.

Figure 6:
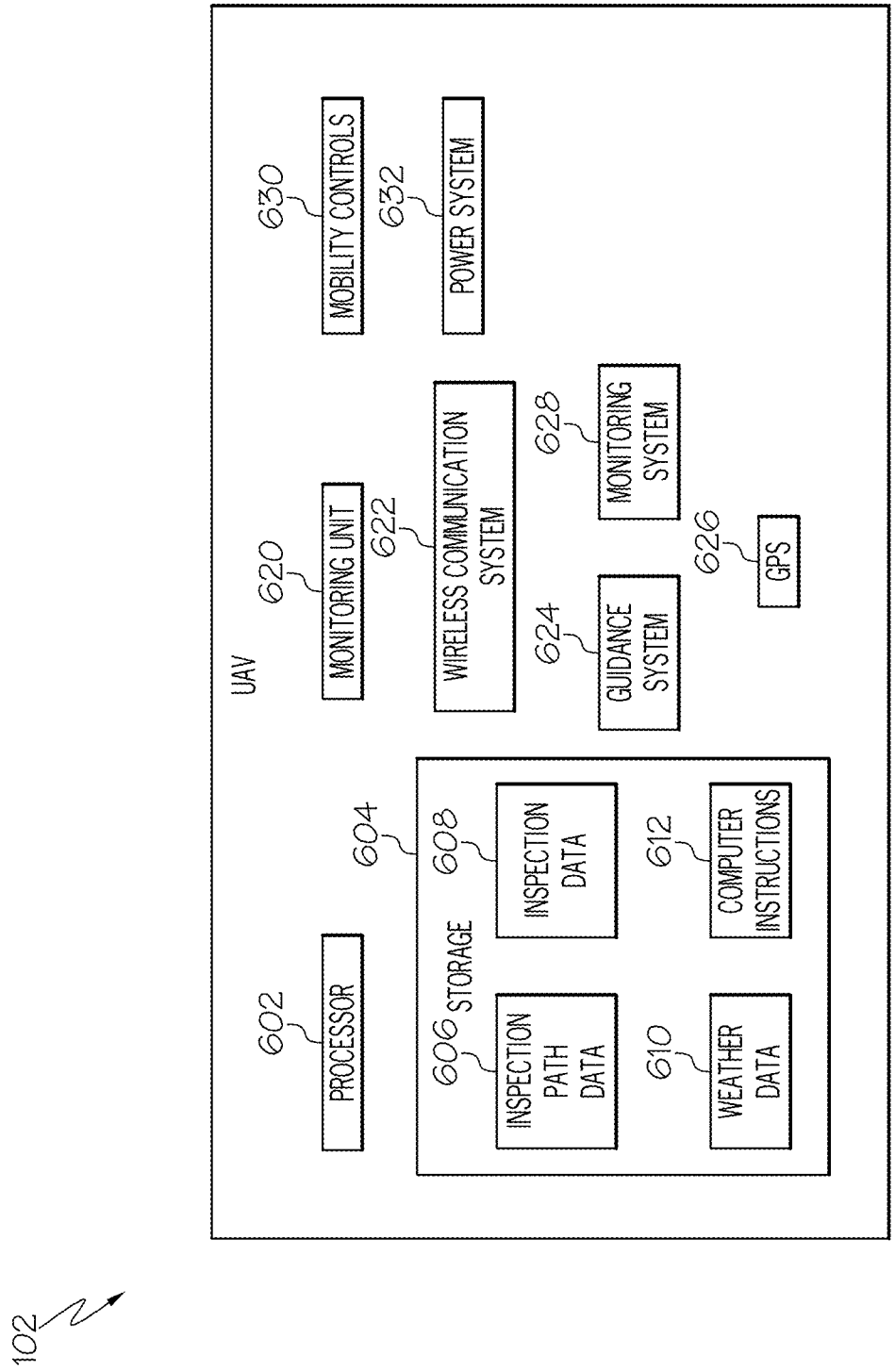
FIG. 6 is a block diagram of an example of an autonomous unmanned aerial vehicle suitable for inspecting the outdoor construction site shown in the previous figures, according to various embodiments of the invention.

FIG. 6 shows an example UAV 102 suitable for use with the inspection and monitoring system 700, according to various embodiments. The UAV 102 includes a processor 602 that performs operations in response to executing computer instructions 612 stored in persistent storage memory 604. Flightpath data 606 is also stored in the memory 604. The flight path data 606 can be used by the processor 602 while controlling the UAV 102 to follow a defined flight path according to the inspection path data 606. Environmental data, such as weather data 610, is also stored in the memory 604 and can be used by processor 602 to set operational parameters of the UAV 102 based on the environmental data 610. The processor 602 controls the flight path followed by the UAV 102 by setting and adjusting mobility controls 630 while receiving guidance information from a guidance system 624 and GPS location information from a GPS receiver 626. An onboard power system 632 provides electrical power for driving the operations of the various components in the UAV 102. The power system 632, in this example, includes a rechargeable battery system.

Figure 7:
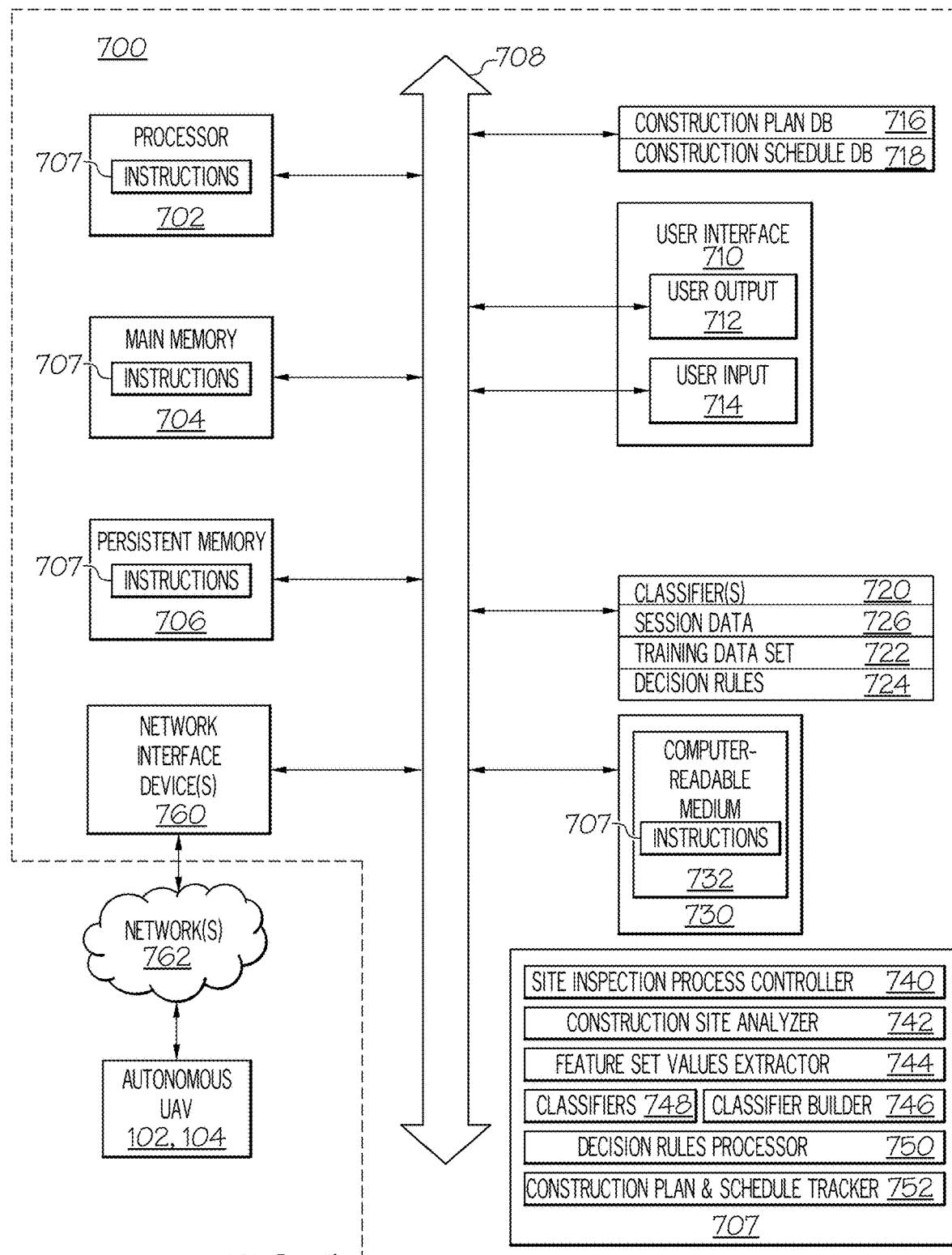
FIG. 7 is a block diagram illustrating an example of an information processing system suitable for use with a method for inspecting the outdoor construction site as shown in the previous figures, according to various embodiments of the invention.

The processor 602 interoperates with an onboard wireless communication system 622 that receives wireless messages (including data and control information) from a remote transmitter and interface 760 of an information processing system 700 (see FIG. 7). The wireless communication system 622 can also transmit wireless messages (including data and control information) to a remote receiver and interface 760 of the information processing system 700. An example of such a wireless message 1002 is shown in FIG. 10.

The autonomously operating UAV 102 can transmit wireless messages 1002 to the remote information processing system 700, which then reports operational conditions in the UAV 102. Wireless messages 1002 can also send captured aerial images 1006 of the construction site 100 to the remote information processing system 700. The wireless messages 1002 can include location information 1008 of the UAV 102 when capturing an aerial image 1006. Wireless messages 1002 can also include current inspection path data 1010 of the UAV 102 following a defined flight path. Other inspection data 1012 can be included in the wireless messages 1002 from the UAV 102 to the remote information processing system 700. For example, the inspection data 1012 can include certain monitored conditions at the UAV 102, such as the altitude of the UAV 102, weather conditions and external light conditions that captured by sensors (not shown) in the UAV 102, or direction data of the UAV 102, or any combination thereof. Each wireless message packet 1002, in this example, includes a message header 1004. This header provides message packet identification and networking information. The header facilitates transmission of each wireless message packet 1002 in a communication network link and the reception of each wireless message packet 1002 by a destination wireless receiver at the information processing system 700.

Regarding FIG. 7, an example of an information processing system 700 includes various components. A processor 702 executes instructions 707 that cause the information processing system 700 to perform operations according to various embodiments of the invention. The processor 702, in this example, is communicatively coupled with various other components of the information processing system 700 via a system bus 708. Main memory 704 contains instructions 707, which can include computer instructions, configuration parameters, and data used by the processor 702. Persistent memory 706 can store the instructions 707 in persistent storage for processor 702.

A user interface 710 includes a user output interface 712 and a user input interface 714 for communicating with the user (e.g., an operator or other technical personnel) using the information processing system 700. The user output interface 712 includes various output devices, such as a computer display device, indicator lights, a speaker that generates sound output to a user, or a data output interface device that can provide data and control signals to a user that comprises a computer system.

The user input interface 714 can include various input devices such as a computer keyboard, mouse device, touch screen display, a microphone that receives sound input signals from a user. The received sound signals, for example, can be converted to an electronic digital representation and stored in memory, and optionally can be used with voice recognition software executed by the processor 702 to receive user input data and commands. The user input interface 714 can include a data input interface device that can receive data and control signals from a user that comprises a computer system.

A construction plan database 716 and a construction schedule database 718 can be communicatively coupled with the processor 702. The processor 702 interoperates with a construction plan and a construction schedule tracker 752 in the information processing system 700 to provide machine-readable data for processor 702. An example construction plan database 716 is shown in FIG. 8. An example construction schedule database 718 is shown in FIG. 9. Both databases will be discussed more fully below.

A machine-learning artificial intelligence (ML/AI) system is communicatively coupled with the information processing system 700 and can be used by the construction site analyzer 742, for example, to analyze the aerially captured images from the UAV 102 and thereby identify individual pieces of equipment located in the construction site 100.

Such an ML/AI system can include, according to various embodiments, a set of classifiers 720 that are used to extract features (e.g., using the feature set values extractor 744 in the instruction 707) of certain pieces of equipment that are installed in a construction site 100. Classifiers 720 can also include functions and operations stored as a collection of classifiers 748 in instructions 702. The ML/AI system trains the classifiers 720 with a training data set 722 that includes images of certain pieces of equipment. In this example ML/AI system, each training data set image is labeled by an expert in construction project technology and equipment used in the construction project in the construction site 100. The ML/AI system receives aerially captured images from UAV 102 and stores the information in a repository as session data 726. The ML/AI system uses the trained classifiers 720, the decision rules 724, and the decision rules processor 750 to identify individual pieces of equipment in the aerially captured images. The ML/AI system uses machine learning based artificial intelligence image recognition and identification of at least one externally placed piece of equipment in the outdoor construction site 100.

The construction site analyzer 742 can compare an identified actual individual piece of equipment in an aerially captured image to an expected (planned) individual piece of equipment from the construction plan database 716, which corresponds to the identified actual individual piece of equipment.

The construction site analyzer 742 also uses time information from the construction schedule database 718 associated with the expected (planned) individual pieces of equipment in the construction plan database 716. Each individual piece of equipment, or a component thereof, to be delivered, installed, or constructed, on the construction site 100 is associated with time information in the construction schedule database 718. According to the example, the time information defines points in time (time points) within spans of time (time spans) in an overall timeline associated with the construction project in the construction site 100. Each individual piece of equipment, therefore, is associated with one or more time points in the construction schedule, which indicate expected time(s) for delivering, installing, or constructing, each individual piece of equipment at a specific location in the construction site 100 as defined by a CAD design plan corresponding to the construction plan.

As shown in FIG. 7, the processor 702 can be communicatively coupled with a computer-readable medium 732. The computer-readable medium 732, according to the present example, is communicatively coupled to a reader/writer device 730, which is communicatively coupled via the system bus 708 to the processor 702.

The instructions 707, which can include computer instructions, configuration parameters, and data, can be stored in the computer-readable medium 732, the main memory 704, the persistent memory 706, and the processor's internal memory such as cache memory and registers.

A network interface device 760 is communicatively coupled with the processor 702 and provides a communication interface for the information processing system 700 to communicate via one or more networks 762. The networks can include wired or wireless networks or a combination of both, and can be any of local area networks, wide area networks, or a combination of such networks. For example, wide area networks, including the Internet and the web, can inter-communicate the information processing system 700 with other information processing systems that may be locally or remotely located relative to the information processing system 700. It should be noted that mobile communications devices, such as mobile phones, Smartphones, tablet computers, lap top computers, and the like, which are capable of at least one of wired or wireless communication, are also examples of information processing systems within the scope of the present disclosure. The UAV 102, 104 is also an example of a mobile communication device that can communicate via wireless communication with the information processing system 700. The UAV 102, 104 is also an example of an information processing system.

As illustrated in FIG. 7, a site inspection process controller 740 instructs the information processing system 700 how to inspect and monitor the construction site using the UAV 102 flying over construction 100. The site inspection process controller 740 also interoperates with the construction site analyzer 742 to coordinate and perform aspects of the various embodiments of the invention.

Referring to FIG. 8, an example construction plan database 716 is shown. Each record in the database is indicated by the rows, and each field in a record is indicated by the columns. A construction plan database 716 can include many different types of information associated with a construction project in the outdoor construction site 100. FIG. 8 illustrates only some of the information tracked in a machine-readable construction plan stored in database 716.

Each record in database 716 is associated with one construction element in the construction plan. An individual piece of equipment is one type of construction element. For each piece of equipment, the record is identified by a construction element ID 802. Start date 804 and end date 806 indicate a range of time for delivery, installation, or construction, of the particular individual piece of equipment in the construction site 100.

A count field 810 keeps track of the number of the particular pieces of equipment to be delivered and installed in the construction site during the range of time. Specific locations 812 for the individual pieces of equipment in the construction site 100 are also included in each record.

Manufacturer information 814 about the particular piece of equipment is maintained in the record. For example, this information 814 can include the make, model, manufacturer part number, manufacturer serial number, description, and specification of the particular individual piece of equipment.

A count difference field 816 keeps track of the number of expected (planned) individual pieces of equipment installed in the construction site 100 less than the number of actual identified located individual pieces of equipment. A location difference field 818 keeps track of differences in location of each actual identified individual piece of equipment compared to its expected (planned) location in the construction site 100.

A compliance requirements field 820 keeps track of the requirements for delivery, installation, and construction of planned individual pieces of equipment to be located in the construction site 100. A compliance status field 822 keeps track of which of the requirements (from the compliance requirements field 820) have been met in actual identified individual pieces of equipment in the construction site 100.

Lastly, a data field 824 for project design tracking keeps track of specific project design data associated with each piece of equipment planned to be located in the construction site. For example, a construction site identification code of the at least one piece of equipment can be maintained in the data field 824. The construction site identification code is specific project design data associated with each piece of equipment.

Referring to FIG. 9, an example construction schedule database 716 is shown. The rows indicate each record in the database, and the columns indicate each field in the record. A construction schedule database 718 can include many different types of time information associated with a construction project in the outdoor construction site 100. FIG. 9 illustrates only some of the time information tracked in a machine-readable construction schedule stored in the database 718.

Each record in the database 718 is associated with one or more time points in a timeline associated with one or more individual pieces of equipment to be located in the construction site 100 during a construction project.

For each particular time point in the timeline, a record is identified by a time point ID 902. A pointer field 904 points into the construction plan database 716 to identify one or more particular records of individual pieces of equipment associated with the specific time point in the construction schedule. Time point information 906 is included in each record. An end date information field 908 is included in each record. This end date field 908 indicates specific dates for the completion of a placement in the construction site 100 for each individual piece of equipment associated with the particular time point.

For each piece of equipment associated with a particular time point, four fields of information are maintained in the particular time point record. In the example shown in FIG. 9, only are shown four fields associated with a first individual piece of equipment and four fields associated with a second individual piece of equipment. The first field 910, 920, includes a total count expected for a particular piece of equipment to be located in the construction site 100. The second field 912, 922, includes specific expected (planned) location information associated with each particular piece of equipment in the construction site. The third field 914, 924 includes a count of an actual identified individual piece of equipment located in the construction site 100. The fourth field 916, 926, includes actual location information associated with each particular piece of equipment located in the construction site 100. The four fields discussed above are maintained in each time point record for each particular piece of equipment associated with the particular time point.

Lastly, data field 928 can include pointer information in each time point record. The pointer information points to a previous time point record in the construction schedule. This pointer information 928 creates a linked list of related time point records in a timeline for a construction project. The processor 702 can traverse the linked list to follow sequential time points in a timeline for a construction project.

Figure 11:
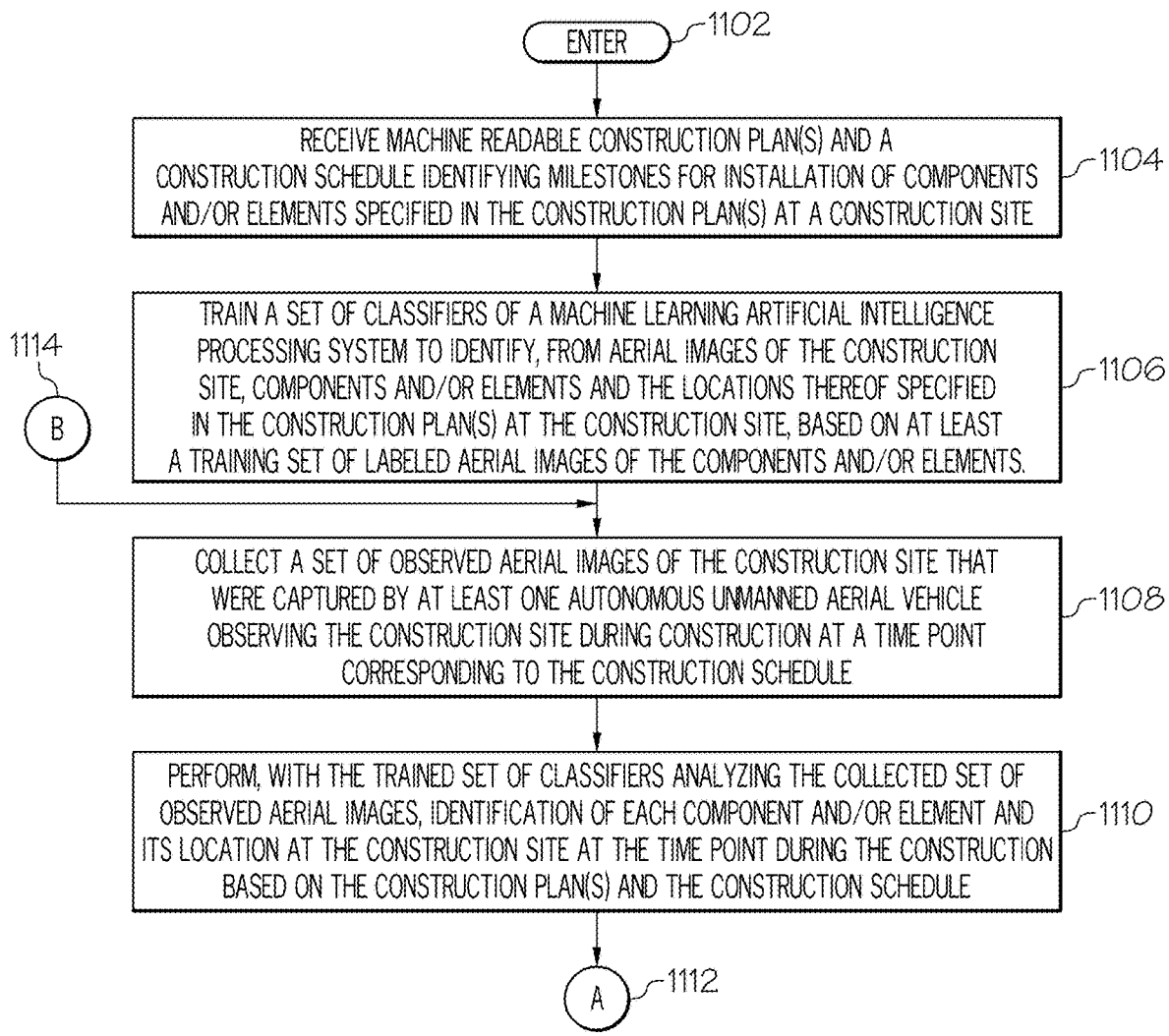
FIGS. 11-13 are operational flow diagrams illustrating example operations of the system of FIG. 1 for aerial inspection of at least one externally placed piece of equipment within an outdoor construction site, according to various embodiments of the invention.
Figure 12:
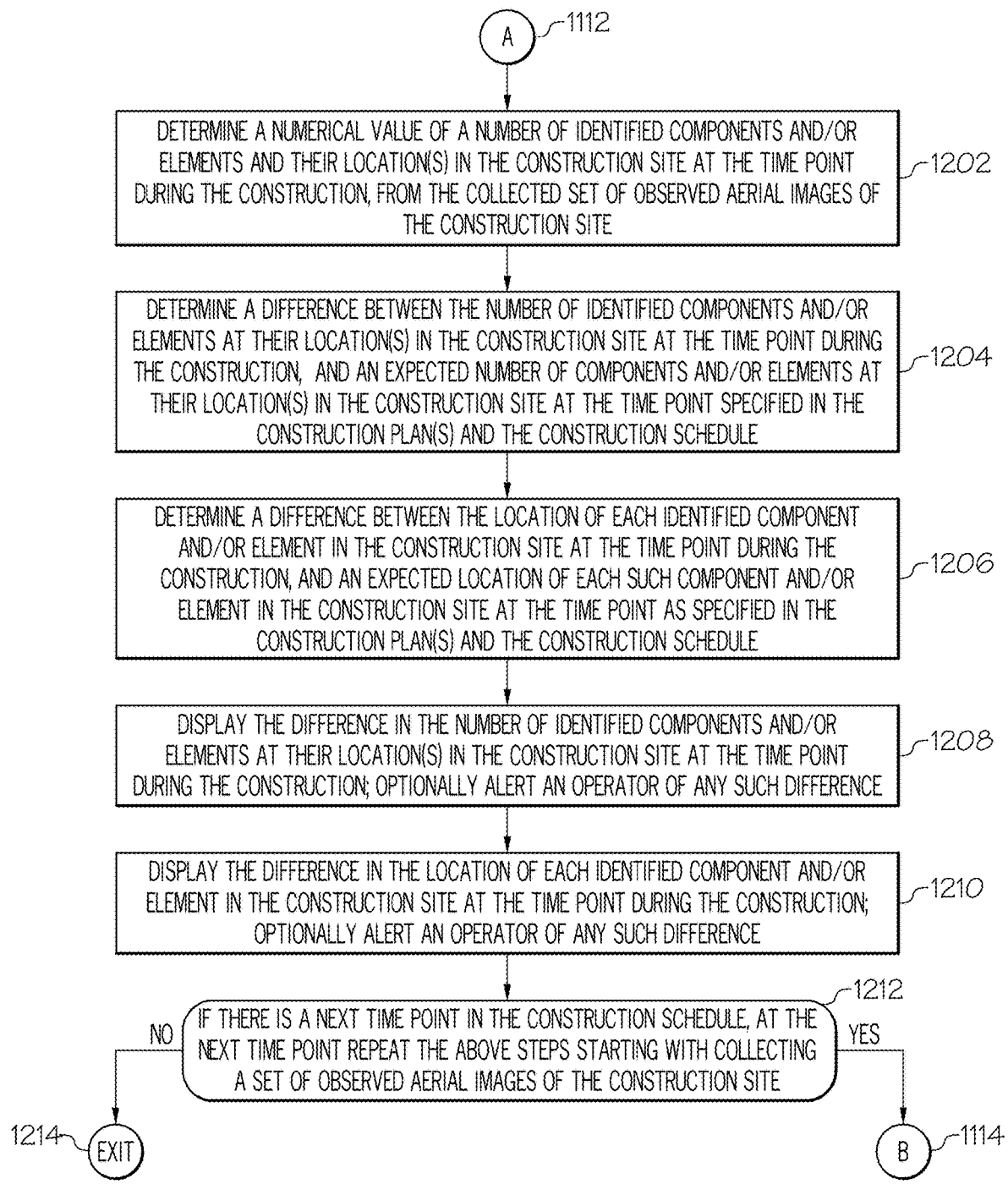
Figure 13:
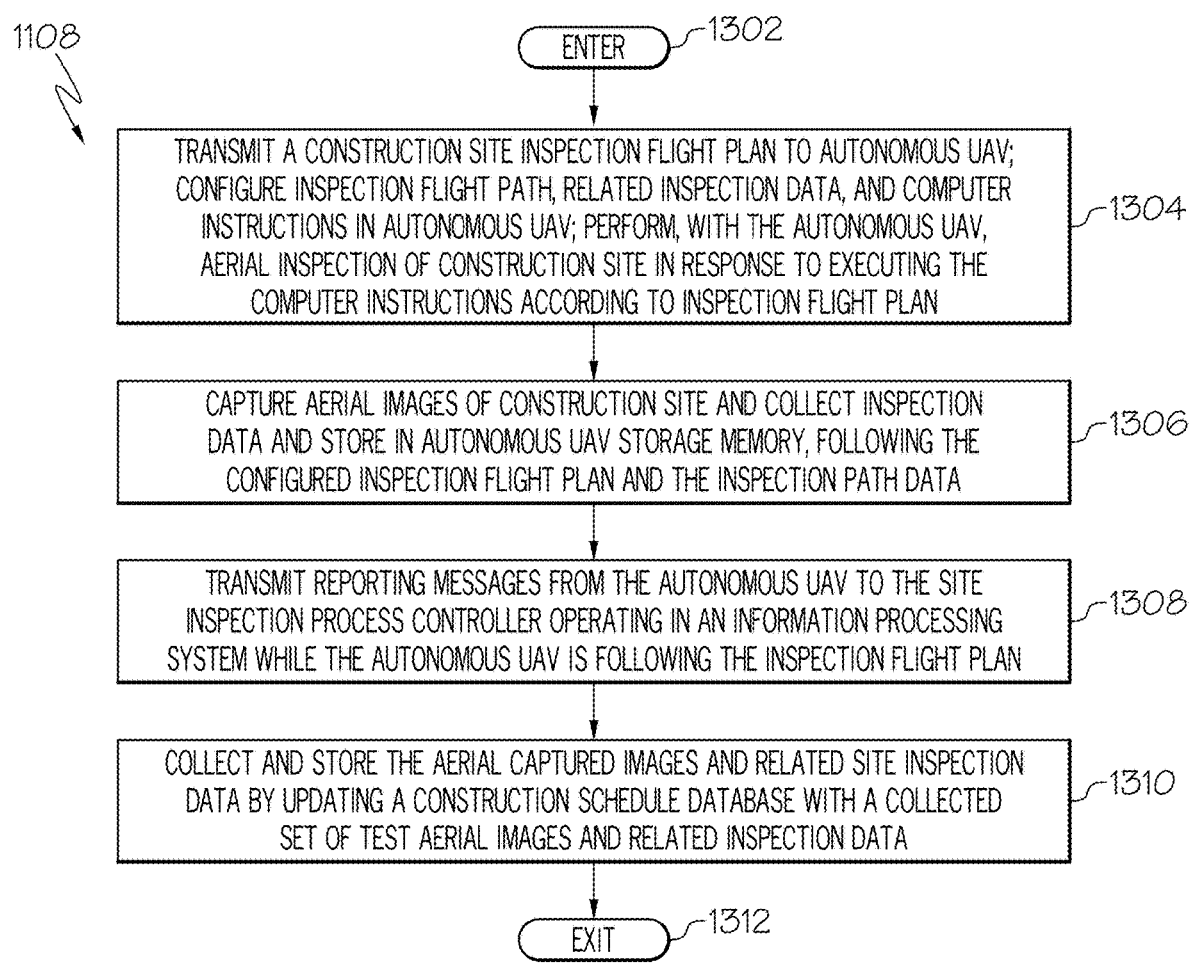

FIGS. 11-13 are operational flow diagrams illustrating example operations of the system of FIG. 1 for aerial inspection of at least one located piece of equipment within an outdoor construction site.

Referring to FIG. 11, an information processing system 700 enters the operational sequence at step 1102. It proceeds to receive, at step 1104, machine-readable construction plan and construction schedule information that identifies time points for the location of one or more individual pieces of equipment in a construction site 100. The system 700, at step 1106, trains a set of classifiers of an ML/AI system to identify, from captured aerial images of the construction site 100, individual pieces of equipment in their specific locations at the construction site. The ML/AI system is trained based on a training set of labeled aerial images of the individual pieces of equipment.

System 700, at step 1108, collects a set of aerial images of the construction site that were observed and aerially captured by at least one autonomous UAV from the construction site during a construction project. The construction project follows a timeline with one or more time points corresponding to the construction schedule.

FIG. 13 describes in more detail the operations of step 1108. The system 700 enters 1302 the operational sequence shown in FIG. 13, and then proceeds, at step 1304, to transmit flight plan information for inspection of the construction site to an autonomous UAV 102. The UAV 102 configures and stores the data in its storage memory based on receiving the transmitted plan. The information includes an inspection flight path for the UAV 102, related inspection data, and computer instructions for the autonomous UAV 102. The UAV 102 performs aerial inspection of the construction site 100 in response to the processor 602 executing the computer instructions according to the inspection flight plan.

The autonomous UAV 102 captures, at step 1306, aerial images of the construction site and collects related inspection data, which are stored in the storage memory onboard the UAV 102. The UAV 102 follows the configured inspection flight plan and uses the stored inspection path data.

The autonomous UAV 102 transmits one or more reporting messages 1002 to the information processing system 700. The system 700 receives the reporting messages, while the UAV 102 follows the inspection flight plan. A site inspection process controller 740, at step 1310, collects and stores the aerially captured images of the construction site and the related site inspection data received from the UAV 102. The system 700 updates a construction schedule database 718 with the collected set of aerial images and the corresponding inspection data. System 700 exits this operational sequence at step 1312 and proceeds to step 1110 (FIG. 11).

The system 700, at step 1110, based on a trained set of classifiers in the ML/AI system analyzing the collection of aerial images, identifies each piece of equipment and its specific location in the construction site at certain time points during the construction project, based on the construction plan and the construction schedule. The system 700, at step 1112, proceeds to determine, at step 1202, a numerical value of a total number of identified individual pieces of equipment in their specific locations in the construction site at certain time points during the construction, from the collected set of aerial images of the construction site.

The system 700, at step 1204, determines a difference between the number of identified individual pieces of equipment at their specific locations in the construction site at the time points during the construction and an expected (planned) number of individual pieces of equipment in their particular locations in the construction site at certain time points specified in the construction plan in the construction schedule.

The system 700, at step 1206, determines at a time point during the construction a difference between the actual location of each identified individual piece of equipment in the construction site and the expected location of each such individual piece of equipment in the construction site as specified in the construction plan and the construction schedule.

The system 700, at step 1208, displays at a user output interface 712 the determined difference in the number of identified individual pieces of equipment at their locations in the construction site and the expected number of individual pieces of equipment at their locations as specified in the construction plan and the construction schedule. Optionally, an alert message is displayed to an operator/user of the system 700 indicating such a difference. An alert message can be provided, for example, if the difference exceeds a predefined threshold.

The system 700, at step 1210, displays the determined difference between the identified location of each individual piece of equipment in the construction site and the expected location of the expected (planned) corresponding individual piece of equipment to be located, as specified in the construction plan and the construction schedule. Optionally, an alert message is displayed to an operator/user of the system 700, indicating such a difference. An alert message can be provided, for example, if a difference between an expected and an identified individual piece of equipment exceeds a predefined threshold.

The system 700, at step 1212, determines if there is a next time point in the construction schedule to repeat the above operational sequence steps starting with the collecting of the set of aerial images of the construction site. Upon determining that there is a next time point, at step 1212, the system 700 proceeds, at step 1114, to repeat the operational sequence steps starting at step 1108. If there is no next time point, at step 1212, the system 700 exits the operational sequence at step 1214.

Optionally, system 700 can create a revised machine-readable construction schedule by updating the machine-readable construction schedule based on the determined difference between the identified and the expected at least one externally placed piece of equipment in the outdoor construction site at one or more time points within respective time spans during the construction.

As will be appreciated by one of ordinary skill in the art, in view of the discussions herein, aspects of the present invention may be embodied as a system, method, or computer program product.

Accordingly, one or more aspects of the present invention may take the form of an entire hardware embodiment, an entire software embodiment (including firmware, resident software, micro-code, etc.), or an embodiment combining software and hardware aspects that may all generally be referred to herein as a "circuit", "module", or "system". Furthermore, parts of the present invention may take the form of a computer program product embodied in one or more computer-readable medium(s) having the computer readable program code embodied thereon.

A system 700 may utilize any combination of computer-readable medium(s). The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the preceding.

More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the preceding. In the context of this document, a computer-readable storage medium may be any tangible medium that can contain or store a program for use by or in connection with an instruction execution system, apparatus, or device.

A computer-readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium, and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the preceding.

Computer program code for carrying out operations for aspects of the present invention may be written in any combination of one or more programming languages, including an object-oriented programming language such as Java, Smalltalk, C++, or the like, and conventional procedural programming languages, such as the "C" programming language or similar programming languages. According to various embodiments of the invention, the program code may execute entirely on a user's computer, partly on a user's computer, as a stand-alone software package, partly on a user's computer and partly on a remote computer or entirely on a remote computer or a server. In the latter scenario, the remote computer or the server may be connected to the user's computer through any type of network, including one or more of a local area network (LAN), a wireless communication network, a wide area network (WAN), or a connection may be made to an external computer (for example, through the Internet using an Internet Service Provider).

Aspects of the present invention have been discussed above with reference to flowchart illustrations and/or block diagrams of methods, apparatus (systems), and computer program products according to various embodiments of the invention. It will be understood that each block of the flowchart illustrations and/or block diagrams and combinations of blocks in the flowchart illustrations and block diagrams can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices, to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices, to cause operational steps to be performed on the computer, other programmable apparatus, or other devices, to produce a computer-implemented process (or method) such that the computer instructions which execute on the computer or other programmable apparatus provide processes for implementing the functions/acts specified in the flowchart and/or block diagram block or blocks.

The terminology used herein is to describe particular embodiments only and is not intended to be limiting of the invention.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "a" or "an," as used herein, are defined as one or more than one. The term plurality, as used herein, is defined as two or more than two. The term another, as used herein, is defined as at least a second or more. The terms "including" and "having", as used herein, are defined as comprising (i.e., open language). The term "coupled", as used herein, is defined as "connected," although not necessarily directly and not necessarily mechanically. The term "configured to" describes the hardware, software, or a combination of hardware and software that is adapted to, set up, arranged, built, composed, constructed, designed, or that has any combination of these characteristics to carry out a given function. The term "adapted to" describes the hardware, software, or a combination of hardware and software capable of performing, able to accommodate the performance of, that is suitable to perform, or that has any combination of the characteristics mentioned above to perform a given function.

The description of the present invention has been presented for purposes of illustration and description but is not intended to be exhaustive or limited to the invention in the form disclosed. Many modifications and variations will be apparent to those of ordinary skill in the art without departing from the scope of the invention. Each embodiment was chosen and described in order to best explain the principles of the invention and the practical application and to enable others of ordinary skill in the art to understand the invention for various embodiments with various modifications as are suited to the particular use contemplated.

What is claimed is:

1. An unmanned aerial vehicle based method for inspection and monitoring construction progress of an outdoor-located power facility in an outdoor construction site, the method comprising:

receiving a machine-readable construction plan and a machine-readable construction schedule identifying milestones for installation in an outdoor construction site of at least one externally placed piece of equipment specified in the machine-readable construction plan;

providing a trained set of classifiers of a machine learning artificial intelligence processing system;

collecting a first set of observed aerial images aerially captured from the outdoor construction site by at least one unmanned aerial vehicle following a first inspection path during construction being performed in the outdoor construction site at a time point within a time span in the machine-readable construction schedule;

performing, with the trained set of classifiers analyzing the collected first set of observed aerial images, machine learning based artificial intelligence image recognition and identification of at least one externally placed piece of equipment in the outdoor construction site at the time point within the time span during the construction, the trained set of classifiers trained to identify from the collected first set of observed aerial images of the outdoor construction site the at least one externally placed piece of equipment in the outdoor construction site;

comparing the identified at least one externally placed piece of equipment in the outdoor construction site to an expected corresponding at least one externally placed piece of equipment in the outdoor construction site at the time point within the time span during the construction as specified in the machine-readable construction plan;

determining, based on the comparison, an observed difference between the identified and the expected at least one externally placed piece of equipment in the outdoor construction site;

reporting, based on the comparison, a determined difference between the identified and the expected at least one externally placed piece of equipment in the outdoor construction site; and creating a revised machine-readable construction schedule by updating the machine-readable construction schedule based on the determined difference between the identified and the expected at least one externally placed piece of equipment in the outdoor construction site at the time point within the time span during the construction.

2. The method of claim 1, wherein the at least one externally placed piece of equipment comprises at least one of:

one or more solar panels;

one or more wind turbines;

one or more outside transformers;
externally placed equipment in a solar farm; or
any combination thereof.

3. The method of claim 1, wherein the outdoor-located power facility comprises at least one of:
a solar farm;
a solar-based electrical power plant;
a wind turbine farm;
a wind-based electrical power plant; or
any combination thereof.

4. The method of claim 1, further comprising:
providing an alert signal to an information processing system, based on the determined observed difference between the identified and the expected at least one externally placed piece of equipment in the outdoor construction site exceeding a predefined threshold.

5. The method of claim 4, further comprising:
providing the alert signal via a user output interface of the information processing system, based on the determined observed difference between the identified and the expected at least one externally placed piece of equipment in the outdoor construction site exceeding a predefined threshold.

6. The method of claim 1, wherein the reporting comprises:
reporting the determined observed difference via a user output interface of an information processing system.

7. The method of claim 1, wherein the reporting comprises:
displaying the determined observed difference via a display device of an information processing system.

8. The method of claim 7, wherein the displaying the determined observed difference comprises displaying one of a plurality of different colors based on whether the determined observed difference exceeds at least a first threshold.

9. The method of claim 1, wherein the determined difference between the identified and the expected at least one externally placed piece of equipment in the outdoor construction site comprises at least one of:
a difference in visual appearance of the identified and the expected at least one externally placed piece of equipment;
a difference in orientation in the construction site of the identified and the expected at least one externally placed piece of equipment;
a difference in location in the construction site of the identified and the expected at least one externally placed piece of equipment; or
a difference of the identified and the expected at least one externally placed piece of equipment in the construction site based on any one or more of the following:
a difference in manufacturer part number of the at least one piece of equipment,
a difference in manufacturer serial number of the at least one piece of equipment, or
a difference in construction site identification code of the at least one piece of equipment.

10. The method of claim 1, further comprising:
controlling, in response to the determining an observed difference, adjustment of at least one observation parameter of the at least one unmanned aerial vehicle;
second collecting, based on the adjusted at least one observation parameter, a second set of observed aerial images aerially captured from the construction site by the at least one unmanned aerial vehicle during construction in the outdoor construction site at a time point within a time span specified in the machine-readable construction schedule;
performing, with the trained set of classifiers analyzing the collected second set of observed aerial images, machine learning based artificial intelligence image recognition and identification of at least one externally placed piece of equipment in the outdoor construction site at the time point within the time span during the construction, the trained set of classifiers trained to identify from the collected second set of observed aerial images of the outdoor construction site the at least one externally placed piece of equipment in the outdoor construction site; and
repeating, based on the performing the machine learning based artificial intelligence image recognition and identification on the second set of observed aerial images, the comparing, the determining, the reporting, and the creating steps.

11. The method of claim 10, wherein the controlling adjustment of at least one observation parameter of the at least one unmanned aerial vehicle, comprises one or more of:
increasing image magnification of aerially captured observed images in the second set of observed aerial images aerially captured from the construction site by the at least one unmanned aerial vehicle;
changing an optical lens of an optical train in the at least one unmanned aerial vehicle for aerially capturing observed images in the second set of observed aerial images; or
changing inspection flight path data in the at least one unmanned aerial vehicle aerially capturing observed images of the second set of observed aerial images.

12. The method of claim 10, wherein the controlling adjustment of at least one observation parameter of the at least one unmanned aerial vehicle, comprises one or more of:
changing inspection flight path data in the at least one unmanned aerial vehicle thereby changing to a second inspection path, different from the first inspection path, of the at least one unmanned aerial vehicle while aerially capturing observed images of the second set of observed aerial images; or
changing inspection path altitude of the at least one unmanned aerial vehicle while aerially capturing observed images of the second set of observed aerial images.

13. The method of claim 1, further comprising:
iteratively performing the above method steps of collecting, performing, comparing, reporting, and creating, at various time points during construction at the construction site where such various time points correspond to time points within one or more time spans specified in the machine-readable construction schedule.

14. The method of claim 1, wherein the creating a revised machine-readable construction schedule comprises updating the machine-readable construction schedule by changing a projected end time of a construction activity specified in the machine-readable construction plan, the machine-readable construction schedule, or both.

15. An information processing system for managing autonomous inspection and monitoring of construction progress of outdoor power facilities, the information processing system comprising:
a processor;
memory communicatively coupled to the processor; and a site inspection process controller; and
a construction schedule tracker, the site inspection process controller and the construction schedule tracker communicatively coupled to the processor and the memory, and wherein the processor, in response to executing computer instructions, performs the following operations:
  receiving a machine-readable construction plan and a machine-readable construction schedule identifying milestones for installation at an outdoor construction site of at least one externally placed piece of equipment specified in the machine-readable construction plan;
  providing a trained set of classifiers of a machine learning artificial intelligence processing system;
  collecting a first set of observed aerial images aerially captured from the construction site by at least one unmanned aerial vehicle following a first inspection path during construction in the outdoor construction site at a time point within a time span specified in the machine-readable construction schedule;
  performing, with the trained set of classifiers analyzing the collected first set of observed aerial images, machine learning based artificial intelligence image recognition and identification of at least one externally placed piece of equipment in the outdoor construction site at the time point within the time span during the construction, the trained set of classifiers trained to identify from the collected first set of observed aerial images of the outdoor construction site the at least one externally placed piece of equipment in the outdoor construction site;
  comparing the identified at least one externally placed piece of equipment in the outdoor construction site to an expected corresponding at least one externally placed piece of equipment in the outdoor construction site at the time point within the time span during the construction as specified in the machine-readable construction plan;
  determining, based on the comparison, an observed difference between the identified and the expected at least one externally placed piece of equipment in the outdoor construction site;
  reporting, based on the comparison, a determined difference between the identified and the expected at least one externally placed piece of equipment in the outdoor construction site; and
  creating a revised machine-readable construction schedule by updating the machine-readable construction schedule based on the determined difference between the identified and the expected at least one externally placed piece of equipment in the outdoor construction site at the time point within the time span during the construction.

16. The information processing system of claim 15, further comprising an user output interface including a computer display, and wherein the processor, in response to executing computer instructions, performs one or more of the following operations:
  reporting the determined observed difference by displaying the determined observed difference via the computer display of the information processing system; or
  providing an alert signal via the user output interface of the information processing system, based on the determined observed difference between the identified and the expected at least one externally placed piece of equipment in the outdoor construction site exceeding a predefined threshold.

17. The information processing system of claim 15, further comprising at least one unmanned aerial vehicle including a processor/controller, storage memory, a camera device, and an optical train including at least one optical lens, the optical train coupling optical data information via the at least one optical lens to the camera device, and thereby to the storage memory, for aerially capturing in the storage memory the first set of observed aerial images from the construction site by the at least one unmanned aerial vehicle following the first inspection path during construction in the outdoor construction site at a time point within a time span specified in the machine-readable construction schedule, and wherein the processor of the information processing system, in response to executing computer instructions, performs the following operations:
  controlling, in response to the determining an observed difference, adjustment of at least one observation parameter of the at least one unmanned aerial vehicle by one or more of:
    increasing image magnification of aerially captured observed images from the construction site by the at least one unmanned aerial vehicle; or
    changing an optical lens in the optical train in the at least one unmanned aerial vehicle for aerially capturing observed images from the construction site by the at least one unmanned aerial vehicle; or
    changing inspection path data in the storage memory in the at least one unmanned aerial vehicle aerially capturing observed images from the construction site;
  second collecting, based on the adjusted at least one observation parameter, a second set of observed aerial images aerially captured from the construction site by the at least one unmanned aerial vehicle during construction in the outdoor construction site at a time point within a time span specified in the machine-readable construction schedule;
  performing, with the trained set of classifiers analyzing the collected second set of observed aerial images, machine learning based artificial intelligence image recognition and identification of at least one externally placed piece of equipment in the outdoor construction site at the time point within the time span during the construction, the trained set of classifiers trained to identify from the collected second set of observed aerial images of the outdoor construction site the at least one externally placed piece of equipment in the outdoor construction site; and
  repeating, based on the performing the machine learning based artificial intelligence image recognition and identification on the second set of observed aerial images, the comparing, the determining, the reporting, and the creating steps.

18. A computer program product for inspection and monitoring construction progress of outdoor power facilities, the computer program product comprising:
  a non-transitory computer readable storage medium having computer readable program code embodied therewith, the computer readable program code comprising computer instructions for:
    receiving a machine-readable construction plan and a machine-readable construction schedule identifying milestones for installation at an outdoor construction site of at least one externally placed piece of equipment specified in the machine-readable construction plan;

providing a trained set of classifiers of a machine learning artificial intelligence processing system;

collecting a first set of observed aerial images aerially captured from the construction site by at least one unmanned aerial vehicle following a first inspection path during construction in the outdoor construction site at a time point within a time span specified in the machine-readable construction schedule;

performing, with the trained set of classifiers analyzing the collected first set of observed aerial images, machine learning based artificial intelligence image recognition and identification of at least one externally placed piece of equipment in the outdoor construction site at the time point within the time span during the construction, the trained set of classifiers trained to identify from the collected first set of observed aerial images of the outdoor construction site the at least one externally placed piece of equipment in the outdoor construction site;

comparing the identified at least one externally placed piece of equipment in the outdoor construction site to an expected corresponding at least one externally placed piece of equipment in the outdoor construction site at the time point within the time span during the construction as specified in the machine-readable construction plan;

determining, based on the comparison, an observed difference between the identified and the expected at least one externally placed piece of equipment in the outdoor construction site;

reporting, based on the comparison, a determined difference between the identified and the expected at least one externally placed piece of equipment in the outdoor construction site; and creating a revised machine-readable construction schedule by updating the machine-readable construction schedule based on the determined difference between the identified and the expected at least one externally placed piece of equipment in the outdoor construction site at the time point within the time span during the construction.

19. The computer program product of claim 18, wherein the computer readable program code comprises computer instructions for:

providing an alert signal via a user output interface of an information processing system, based on the determined observed difference between the identified and the expected at least one externally placed piece of equipment in the outdoor construction site exceeding a predefined threshold.

20. The computer program product of claim 18, wherein the computer readable program code comprises computer instructions for:

controlling, in response to the determining an observed difference, adjustment of at least one observation parameter of the at least one unmanned aerial vehicle;

second collecting, based on the adjusted at least one observation parameter, a second set of observed aerial images aerially captured from the construction site by the at least one unmanned aerial vehicle during construction in the outdoor construction site at a time point within a time span specified in the machine-readable construction schedule; and performing, with the trained set of classifiers analyzing the collected second set of observed aerial images, machine learning based artificial intelligence image recognition and identification of at least one externally placed piece of equipment in the outdoor construction site at the time point within the time span during the construction, the trained set of classifiers trained to identify from the collected second set of observed aerial images of the outdoor construction site the at least one externally placed piece of equipment in the outdoor construction site; and repeating, based on the performing the machine learning based artificial intelligence image recognition and identification on the second set of observed aerial images, the comparing, the determining, the reporting, and the creating steps.

* * * * *